United States Patent Office 3,152,170
Patented Oct. 6, 1964

3,152,170
PRODUCTION OF UNSATURATED ALIPHATIC NITRILES
John Lynn Barclay, Tadworth, John Bernard Bream, Redbourn, David James Hadley, Epsom Downs, and David Gordon Stewart, Epsom, England, assignors to The Distillers Company Limited, Edinburgh, Scotland
No Drawing. Filed June 27, 1960, Ser. No. 38,740
Claims priority, application Great Britain July 1, 1959
9 Claims. (Cl. 260—465.3)

The present invention relates to the production of unsaturated aliphatic nitriles, and in particular to the production of acrylonitrile and methacrylonitrile.

According to the present invention, the process for the production of acrylonitrile or methacrylonitrile comprises reacting at an elevated temperature in the vapour phase propylene or isobutene with oxygen and ammonia over an oxidation catalyst comprising (i) a mixture of the oxides of antimony and tin and/or (ii) a compound of antimony, tin and oxygen.

The catalysts used in the process of the present invention must include antimony, oxygen and tin and may be regarded either as mixtures of antimony oxides with tin oxides or as oxygen-containing compounds of antimony and tin, such as tin antimonate; under the reaction conditions the catalyst may be present in either or both forms. The catalyst may be prepared in any suitable manner, for instance from the oxides of antimony and tin, or from compounds of tin or antimony, such as the hydroxides, which on heating in the presence of an oxygen-containing gas, such as air, are converted to the oxides. Any of the oxides of antimony and tin or substances yielding these oxides, may be used in the manufacture of the catalyst, such as antimony trioxide, antimony tetroxide, antimony pentoxide or mixtures of such oxides; stannic oxide, stannous oxide, meta-stannic acid or mixtures of such oxides. Hydrated forms of these oxides may also be used, for instance such as are formed by the action of aqueous nitric acid on antimony or tin metals or on mixtures of the metals. We have found that particularly good catalysts are those in which antimony tetroxide is associated, either as a mixture or in combination, with stannic oxide.

The atomic ratio of tin to antimony in the catalysts may vary within moderately wide limits, for instance between 0.1:1 and 10:1, i.e., between 1:10 and 10:1, although catalysts containing proportions of tin to antimony outside this range may also be used. Though the catalyst mixture can be used as such, it is sometimes advantageous to subject it to a prior heat-treatment in the presence of an oxygen-containing gas such as air, for instance at a temperature between 540° and 1100° C., and the optimum temperature for the heat-treatment is related to the proportion of antimony to tin in the catalyst. For instance, catalysts containing 2 atoms of tin per atom of antimony give good results when heated at about 950° C., catalysts containing 1 atom of tin per 4 atoms of antimony give good results when heated at about 700° C.

A particularly preferred method of preparing the antimony oxide/tin oxide catalyst comprises intimately mixing stannic oxide or the hydrated oxide obtained by the action of aqueous nitric acid on tin metal, with antimony pentoxide, antimony tetroxide, or the hydrated oxide formed by the action of aqueous nitric acid on antimony metal, and heat-treating the resulting mixture at 550° to 1100° C.

Another preferred method of preparing the antimony oxide/tin oxide catalyst comprises hydrolysing with water cationic salts of the metals, such as the chlorides, and recovering and heating the resulting precipitate. To obtain complete hydrolysis it may be necessary to add a volatile base such as ammonia. Either or both of the metal oxide components of the catalyst may be prepared in this way. Particularly useful catalysts can be prepared by this method from stannic chloride and antimony pentachloride by mixing them together in aqueous media and adding ammonia until the pH is greater than 5.0, recovering the precipitate and heating it at a temperature between 550° and 1100° C.

When the tin and antimony compounds in the mixture are present in the lower valency state, i.e. as divalent tin or trivalent antimony compounds, it is particularly preferred to subject the mixture to a preliminary heat-treatment in an atmosphere comprising oxygen and an inert gas such as nitrogen, carbon dioxide or steam, the proportion of oxygen and the total flow of gas being controlled so that no part of the catalyst during this preliminary heat-treatment exceeds a temperature of about 650° C. After this preliminary heat-treatment, the mixture is then subjected to a final heat-treatment in air at a temperature in the range 550° to 1100° C.

The antimony oxide catalysts used in the process of the present invention may, if desired, be deposited on supports, e.g. silica.

The reaction of propylene or isobutene with oxygen and ammonia over the catalyst may be carried out in any suitable manner, for instance as a fixed bed process in which the catalyst is used in the form of granules or pellets, or as a fluidised bed process, or as a moving bed process.

The proportion of olefine in the feed to the reaction may vary within fairly wide limits, for example between 1 and 20% by volume of the feed, and suitably between about 2 and 10% by volume. It is preferred to use between 4 and 6% by volume of the olefine in the feed. The preferred olefine is propylene.

The concentration of oxygen in the feed may also vary within moderately wide limits, for example between 1 and 20% by volume and preferably between 2 and 15% by volume. The oxygen may be diluted with inert gases, and may be, for example, supplied as air.

The reaction is suitably carried out in the presence, as diluent, of a gas which is substantially inert under the conditions of reaction, for example, nitrogen, propane, butane, isobutane, carbon dioxide and steam. It is preferred to carry out the reaction in the presence of steam or mixtures of steam and nitrogen. The concentration of the steam may vary within wide limits, for instance between 20 and 60% by volume of the feed.

The concentration of ammonia may also vary within moderately wide limits, for instance between 2 and 10% by volume of the feed. If the maximum yield of acrylonitrile is required it is desirable to use an excess of ammonia, for instance such that the gas mixture issuing from the reactor contains at least 1 mole of ammonia for every 10 moles of acrylonitrile. The preferred concentration of ammonia is about 6% by volume of the feed where this contains 5% of propylene.

The reaction is carried out at an elevated temperature, preferably between 300 and 550° C.

The contact time, defined as the volume of catalyst divided by the flow of gas per second calculated at room temperature and pressure, may be, for example, in the range 1–30 seconds.

The reaction may be carried out at atmospheric pressure, or at super- or sub-atmospheric pressures. It is preferred to operate at a pressure of 1 to 5 atmospheres absolute.

The unsaturated nitrile may be recovered from the reaction products in any suitable manner, for example by extraction with water, preferably at an acid pH, followed by fractional distillation. In one method the hot reaction gases are contacted firstly with a cold dilute aqueous acid solution which neutralizes excess ammonia and extracts some of the nitrile, and secondly with cold water to extract the remainder of the nitrile; the nitrile is subsequently recovered from the extracts by fractional distillation.

The process of the invention is further illustrated with reference to the following examples, in which the parts by weight and parts by volume bear the same relation to each other as do grams to milliliters.

Example 1

153.4 parts by weight of stannous chloride ($SnCl_2.H_2O$) were dissolved in 150 parts by weight of 1% hydrochloric acid. This solution was added slowly to 1,500 parts by weight of vigorously stirred water. Simultaneously, 67.75 parts by weight of antimony pentachloride ($SbCl_5$) were added dropwise. When the addition was complete the temperature was raised to 95° C. for five minutes. The mixture was then cooled to room temperature, diluted with 500 parts by weight of water and the pH adjusted to between 5–5.5 by the addition of dilute ammonia solution. The resultant precipitate was filtered, washed by resuspension in water and refiltered. The filtrate was dried at 100° C. and heated in air at 380° C. for three hours. Heating was then continued at 540° C. for 16 hours. The resultant catalyst was then granulated.

19.6 parts by weight of the catalyst were placed in a reactor maintained at 411° C. A gas mixture comprising 2 parts by volume of propylene, 4 parts by volume of ammonia and 94 parts by volume of air was passed over the catalyst at a flow rate of 25,000 parts by volume per hour measured at N.T.P.

47.7% of the propylene was converted to acrylonitrile and 17.4% to carbon dioxide.

Example 2

48.7 parts by weight of powdered tin metal were slowly added to a well-stirred solution of 250 parts by volume of nitric acid (S.G. 1.42) dissolved in 1,000 parts by weight of water. During the addition the acid was maintained at its boiling point. 200 parts by weight of powdered antimony metal were added to 850 parts by volume of nitric acid (S.G. 1.42) with stirring. Both acid mixtures were boiled with stirring until no more brown nitrous fumes were evolved. The tin oxide suspension was then added to the antimony mixture and stirred for several minutes. The mixture was filtered, washed with distilled water, dried, and the resulting powder mixed with 2% by weight of graphite and pelleted. The catalyst was then heat-treated at 700° C. for 16 hours, and finally at 1,000° C. for 16 hours. The catalyst had an atomic ratio of tin to antimony of 1:4.

The catalyst was placed in a reactor maintained at 471° C. and a gaseous mixture of 5% by volume of propylene, 6% by volume of ammonia, 55% by volume of air and 34% by volume of steam was passed over the catalyst, the contact time being 4 seconds.

Of the propylene fed, 63.9% was converted to acrylonitrile. The yield of acrylonitrile based on propylene consumed was 67.4%.

Example 3

Powdered tin (190 parts by weight) was added in small portions to a boiling solution of nitric acid (800 parts by volume of concentrated nitric acid in 3200 parts by weight of water). Powdered antimony (97.6 parts by weight) was added in small portions to warm concentrated nitric acid (400 parts by volume). Both mixtures were boiled until no further brown nitrous fumes were evolved. While still hot the antimony oxide suspension was added to the tin mixture with stirring, the precipitate was filtered off, washed with water, dried, and sieved to give granules of less than 30 mesh B.S.S., pelleted and heated in air at 700° C. for 16 hours, and then at 1000° C. for 16 hours. The catalyst had an atomic ratio of tin to antimony of 2:1.

The catalyst was placed in a reactor maintained at 481° C., and a gaseous mixture of 5% by volume of propylene, 54% by volume of air, 35% by volume of steam, and 6% by volume of ammonia was passed over the catalyst, the contact time being 3.6 seconds.

Of the propylene fed 58.5% was converted to acrylonitrile. The yield of acrylonitrile based on propylene consumed was 63.7%. The reaction product contained less than 1% of acetonitrile.

Example 4

A catalyst was prepared by intimately mixing 492 parts by weight of antimony tetroxide with the precipitated tin oxide obtained by adding 95 parts by weight of tin powder to 400 parts by volume of concentrated nitric acid in 1600 parts by volume of water.

The mixture was heated at 650° C. for 16 hours, and pelleted.

The catalyst was placed in a reactor maintained at 481° C., and a gaseous mixture comprising 5% by volume of propylene, 55% by volume of air, 34% by volume of steam and 6% by volume of ammonia was passed over the catalyst, the contact time being 4 seconds.

Of the propylene fed, 65.5% was converted to acrylonitrile. The yield of acrylonitrile based on propylene consumed was 71.5%.

Example 5

85.7 parts by weight of commercial antimony pentoxide was heated at 725° C. for 8 hours, sieved to pass a 200 mesh B.S.S. sieve, and made into a slurry with water. 16.5 parts by weight of tin powder was added to a boiling solution of nitric acid (70 parts by volume of concentrated nitric acid in 280 parts by weight of water) and the precipitated tin oxide filtered, washed and made into a slurry with water. The two slurries were mixed together, filtered and dried at 100° C. The resultant catalyst was sieved to less than 18 mesh B.S.S., heated at 725° C. for 16 hours, sieved to less than 25 mesh B.S.S. and formed into pellets.

The catalyst was placed in a reactor maintained at 492° C., and a gaseous mixture of 5% by volume of propylene, 54.5% by volume of air, 34.3% by volume of steam and 6.2% by volume of ammonia was passed over the catalyst, the contact time being 4.1 seconds.

Of the propylene fed 62.0% was converted to acrylonitrile. The yield of acrylonitrile based on propylene consumed was 65.7%.

Example 6

A tin oxide/antimony oxide catalyst having an atomic ratio of tin to antimony of 1:4 was prepared in a similar manner to the catalyst described in Example 2, the catalyst being heat-treated first at 650° C. for 16 hours and subsequently at 725° C. for 16 hours.

The catalyst was placed in a reactor maintained at 420° C. and a gaseous mixture of 5% by volume of isobutene, 6% by volume of ammonia, 34% by volume of steam and 55% by volume of air was passed over the catalyst, the contact time being 4 seconds.

Of the isobutene fed, 41% was converted to methacrylonitrile.

Example 7

A tin oxide/antimony oxide catalyst having an atomic ratio of tin to antimony of 2:1 was prepared as described in Example 3.

The catalyst was placed in a tubular reactor of internal diameter 25 mm., maintained at 492° C., and was fluidized by admitting a gaseous feed of 5% by volume of propylene, 6% by volume of ammonia, 34% by volume of steam and 55% by volume of air, the total gas flow being 918 litres, measured at room temperature and pressure, per litre of catalyst per hour.

Of the propylene fed 58.6% was converted to acrylonitrile. The yield of acrylonitrile based on propylene consumed was 63.2%.

We claim:

1. The process for the production of an unsaturated aliphatic nitrile selected from the group consisting of acrylonitrile and methacrylonitrile which comprises reacting at an elevated temperature in the vapor phase and in the presence of an inert gaseous diluent, an olefine selected from the group consisting of propylene, for the production of acrylonitrile, and isobutene, for the production of methacrylonitrile, with oxygen and ammonia over an oxide composition consisting essentially of antimony, tin and oxygen as an oxidation catalyst in which the atomic ratio of tin to antimony is between 1:10 and 10:1.

2. The process as claimed in claim 1 wherein the catalyst is formed by heating at a temperature between 540 and 1100° C. in the presence of oxygen, a substance selected from the group consisting of stannous oxide, stannic oxide, the hydrated oxide, which is obtained by the action of aqueous nitric acid on tin metal, and mixtures of any of these oxides together with a substance selected from the group consisting of antimony trioxide, antimony tetroxide, antimony pentoxide, the hydrated oxide which is obtained by the action of aqueous nitric acid on antimony metal, and mixtures of any of these oxides.

3. The process as claimed in claim 1 wherein the concentration of olefine in the feed is between 2% and 10% by volume.

4. The process as claimed in claim 1 wherein the concentration of oxygen in the feed is between 1% and 20% by volume.

5. The process as claimed in claim 1 wherein the inert gaseous diluent is selected from the group consisting of steam and mixtures of steam and nitrogen.

6. The process as claimed in claim 1 wherein the concentration of ammonia in the feed is between 2 and 10%.

7. The process as claimed in claim 1 wherein the reaction is carried out at a temperature between about 300° and 550° C.

8. The process as claimed in claim 1 wherein the catalyst is a mixture of antimony tetroxide with stannic oxide.

9. The process as claimed in claim 1 wherein at least one of the antimony and tin oxides is formed by hydrolyzing a cationic salt of the metal and heating the resulting hydrated oxide at a temperature between 540° C. and 1100° C.

References Cited in the file of this patent

UNITED STATES PATENTS

| | | |
|---|---|---|
| 1,896,627 | Jaeger | Feb. 7, 1933 |
| 2,481,826 | Cosby | Sept. 13, 1949 |
| 2,736,739 | England et al. | Feb. 28, 1956 |
| 2,904,580 | Idol | Sept. 15, 1959 |

OTHER REFERENCES

Berkman et al.: "Catalysis," 1940, page 702.